(12) United States Patent
Awad et al.

(10) Patent No.: US 11,871,368 B2
(45) Date of Patent: Jan. 9, 2024

(54) COMMUNICATIONS DEVICE AND METHOD FOR SYNCHRONISING WITH A WIRELESS ACCESS INTERFACE

(71) Applicants: Sony Corporation, Tokyo (JP); Sony Mobile Communications Inc., Tokyo (JP)

(72) Inventors: Yassin Aden Awad, Basingstoke (GB); Vivek Sharma, Basingstoke (GB); Anders Berggren, Lund (SE); Yuxin Wei, Basingstoke (GB); Hideji Wakabayashi, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 75 days.

(21) Appl. No.: 17/272,664

(22) PCT Filed: Sep. 20, 2019

(86) PCT No.: PCT/EP2019/075288
§ 371 (c)(1),
(2) Date: Mar. 2, 2021

(87) PCT Pub. No.: WO2020/064529
PCT Pub. Date: Apr. 2, 2020

(65) Prior Publication Data
US 2021/0195544 A1   Jun. 24, 2021

(30) Foreign Application Priority Data
Sep. 27, 2018 (EP) .................................. 18197359

(51) Int. Cl.
*H04W 56/00* (2009.01)
*H04B 17/318* (2015.01)
(Continued)

(52) U.S. Cl.
CPC ........ *H04W 56/0015* (2013.01); *H04B 7/088* (2013.01); *H04B 17/318* (2015.01); *H04W 74/0833* (2013.01)

(58) Field of Classification Search
CPC .......... H04W 56/0015; H04W 74/0833; H04B 7/088; H04B 17/318
See application file for complete search history.

(56) References Cited

U.S. PATENT DOCUMENTS

2016/0157267 A1   6/2016 Frenne
2017/0332406 A1   11/2017 Islam et al.
(Continued)

FOREIGN PATENT DOCUMENTS

| CN | 103765792 A | 4/2014 |
|----|-------------|--------|
| CN | 107919897 A | 4/2018 |

(Continued)

OTHER PUBLICATIONS

International Search Report and Written Opinion dated Mar. 18, 2020, received for PCT Application PCT/EP2019/075288 Filed on Sep. 20, 2019, 18 pages.

(Continued)

*Primary Examiner* — Walli Z Butt
(74) *Attorney, Agent, or Firm* — XSENSUS LLP

(57) ABSTRACT

A method of operating a communications device comprises detecting a plurality of beams of radio signals each being transmitted periodically according to a time divided structure of a wireless access interface provided by a wireless communications network, selecting a first of the plurality of beams of radio signals for detecting a first version of a synchronisation signal transmitted with the first beam of radio signals, selecting a second of the plurality of beams of radio signals for detecting a second version of the synchronisation signal transmitted with the second beam of radio (Continued)

signals, and synchronising with the time divided structure of the wireless access interface from at least one of the first version of the synchronisation signal and the second version of the synchronisation signal.

17 Claims, 8 Drawing Sheets

(51) Int. Cl.
  *H04B 7/08* (2006.01)
  *H04W 74/08* (2009.01)

(56) References Cited

U.S. PATENT DOCUMENTS

| | | | |
|---|---|---|---|
| 2019/0104552 A1* | 4/2019 | Hui | H04W 48/10 |
| 2020/0053788 A1* | 2/2020 | Wang | H04W 74/0833 |
| 2020/0059922 A1* | 2/2020 | John Wilson | H04B 7/0695 |
| 2020/0100290 A1* | 3/2020 | Mundarath | H04W 74/0833 |

FOREIGN PATENT DOCUMENTS

| | | |
|---|---|---|
| EP | 3373659 A1 | 9/2018 |
| WO | 2018/058574 A1 | 4/2018 |
| WO | 2018/064988 A1 | 4/2018 |

OTHER PUBLICATIONS

Interdigital Communications, "Random Access Aspects for Beam-Based NR Initial Access", 3GPP TSG-RAN WG1 #86bis, R1-161320, Oct. 10-14, 2016, pp. 1-5.

Holma et al., "LTE for UMTS OFDMA and SC-FDMA Based Radio Access", John Wiley and Sons, 2009, pp. 25-27.

NTT DOCOMO, "New SID Proposal: Study on New Radio Access Technology", 3GPP TSG RAN Meeting #71, RP-160671, Mar. 7-10, 2016, 8 pages.

Nokia et al., "Support for Beam Based Common Control Plane", 3GPP TSG-RAN WG1#85, R1-165364, May 23-27, 2016, 5 pages.

3GPP, "Study on Scenarios and Requirements for Next Generation Access Technologies (Release 14)", TR 38.913 V14.3.0, Jun. 2017, pp. 1-39.

NTT DOCOMO, "Revised WID on New Radio Access Technology", 3GPP TSG RAN Meeting #78, RP-172834, Dec. 18-21, 2017, 11 pages.

3GPP "Random access aspects for beam-based NR initial access" InterDigital Communications, Oct. 10, 2016-Oct. 14, 2016, RSG-RAN WG1 #86bos, R1-1610320, pp. 1-5, Lisbon, Portugal.

Office Action dated Jun. 5, 2023 in European Patent Application No. 19 772 725.8, 7 pages.

* cited by examiner

COMMUNICATIONS DEVICE AND METHOD FOR SYNCHRONISING WITH A WIRELESS ACCESS INTERFACE

CROSS-REFERENCE TO RELATED APPLICATIONS

The present application is based on PCT filing PCT/EP2019/075288, filed Sep. 20, 2019, which claims priority to EP 18197359.5, filed Sep. 27, 2018, the entire contents of each are incorporated herein by reference.

BACKGROUND

Field of the Present Technique

The present disclosure relates to communications devices configured to acquire synchronisation initial access to a wireless communications network and methods of operating a communications device. The present technique also relates to infrastructure equipment and methods of operating the infrastructure equipment configured for transmitting a plurality of directional beams of radio signals.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present technique.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

There is therefore expected to be a desire for future wireless communications networks, which may be referred to as 5G or new radio access technology networks, to support connectivity for a wide range of devices associated with different applications. Furthermore it is expected that wireless communications networks configured in accordance with new radio access technology (RAT) will employ beam forming using directional antenna arrays to improve coverage, provide higher data rates and make more efficient use of communications resources. However the use of beam forming may also give rise to new challenges. One such challenge is a need to develop effective techniques for synchronisation.

SUMMARY OF THE PRESENT TECHNIQUE

The present disclosure can help address or mitigate at least some of the issues discussed above.

Embodiment of the present technique can provide a method of operating a communications device to transmit data to or to receive data from a wireless communications network. The method comprises detecting a plurality of beams of radio signals each being transmitted periodically according to a time divided structure of a wireless access interface provided by the wireless communications network, selecting a first of the plurality of beams of radio signals for detecting a first version of a synchronisation signal transmitted with the first beam of radio signals, selecting a second of the plurality of beams of radio signals for detecting a second version of the synchronisation signal transmitted with the second beam of radio signals, and synchronising with the time divided structure of the wireless access interface from at least one of the first version of the synchronisation signal and the second version of the synchronisation signal. The synchronising may include synchronising data transmission to or data reception from the wireless communications network. The synchronisation signals may include a primary synchronisation signal, a secondary synchronisation signal and a physical broadcast channel providing system configuration information required for initial access to the wireless communications network.

Embodiments of the present technique find application with reducing a time to acquire synchronisation and enabling communications devices more efficiently to synchronise with a time divided structure of a wireless communications network in which infrastructure equipment transmit radio signals in directional beams which are displaced in one or both of time or space. If a communications device is monitoring a plurality of the beams to receive different versions of the radio signals then if one of those beams is interrupted, then synchronisation can still be achieved through the version of the synchronisation signal detected from the other beam.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily understood by reference to the following detailed description of example embodiments with reference to the accompanying drawings wherein like reference numerals designate identical or corresponding parts throughout the several views, and wherein.

DESCRIPTION OF EXAMPLE EMBODIMENTS

Long Term Evolution Advanced Radio Access Technology (4G)

Figure 1:
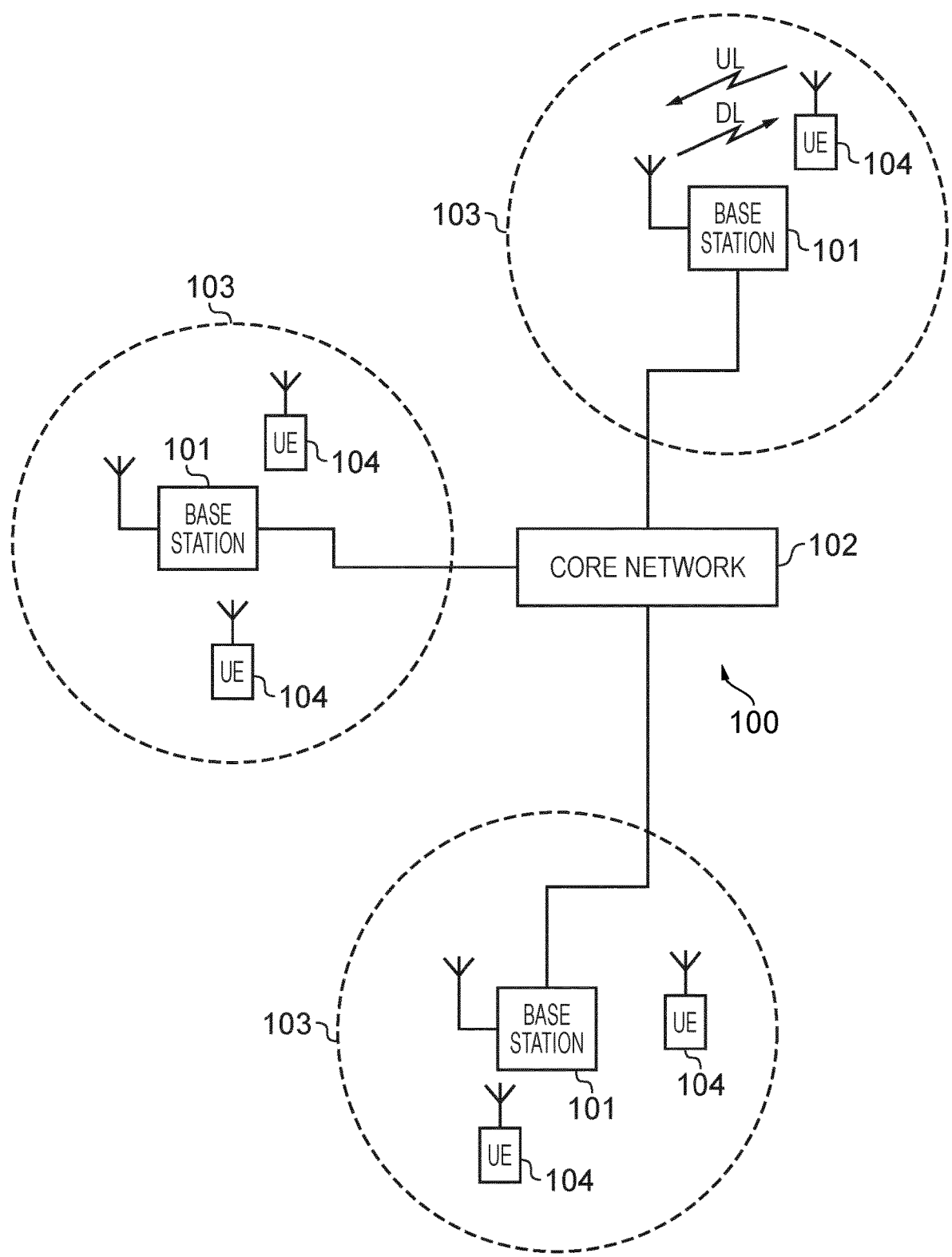
FIG. 1 schematically represents some aspects of an LTE-type wireless communication system.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
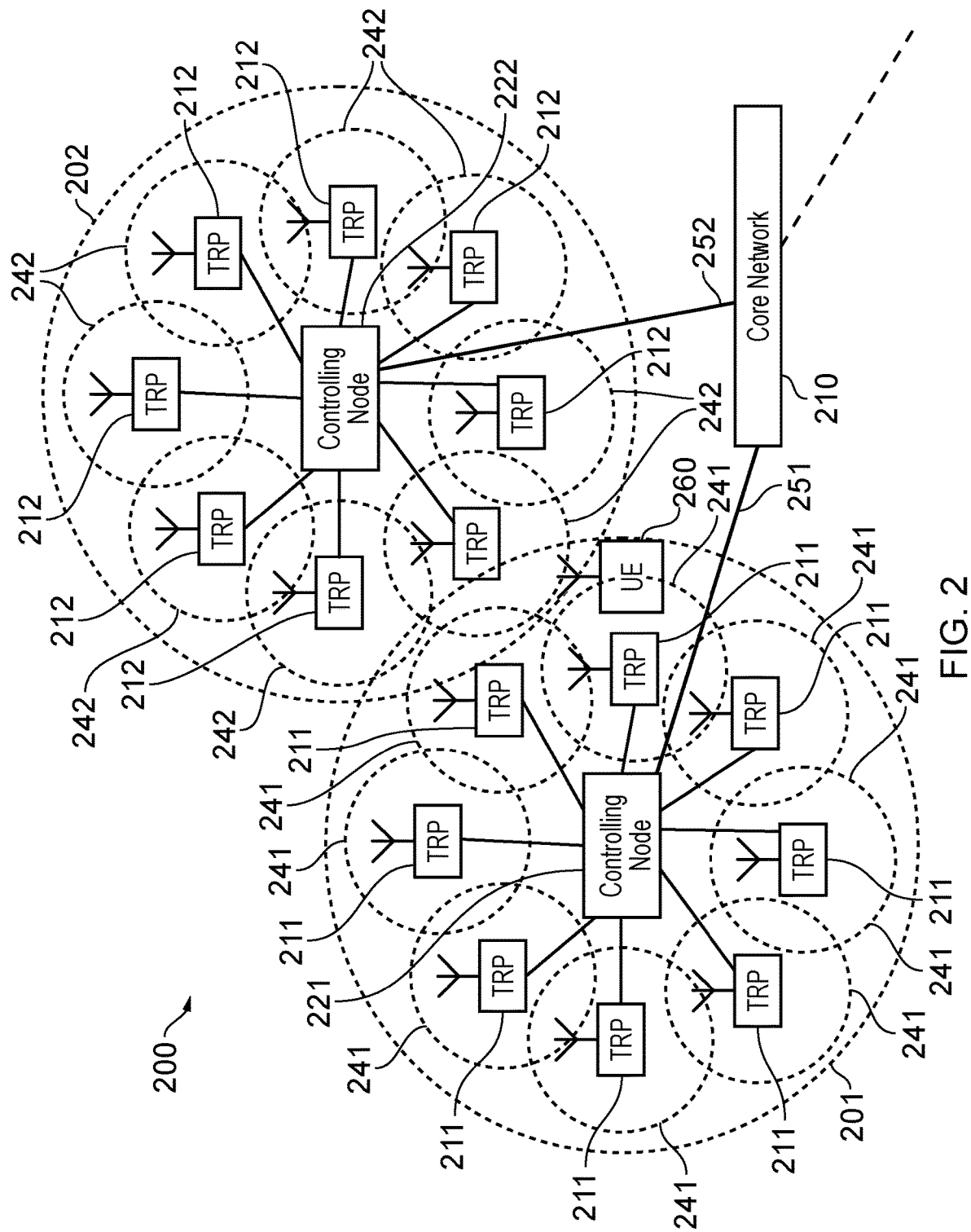
FIG. 2 schematically represents some aspects of a new radio access technology (RAT) wireless communications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Improvement in or Relating to UE Synchronisation

Figure 3:
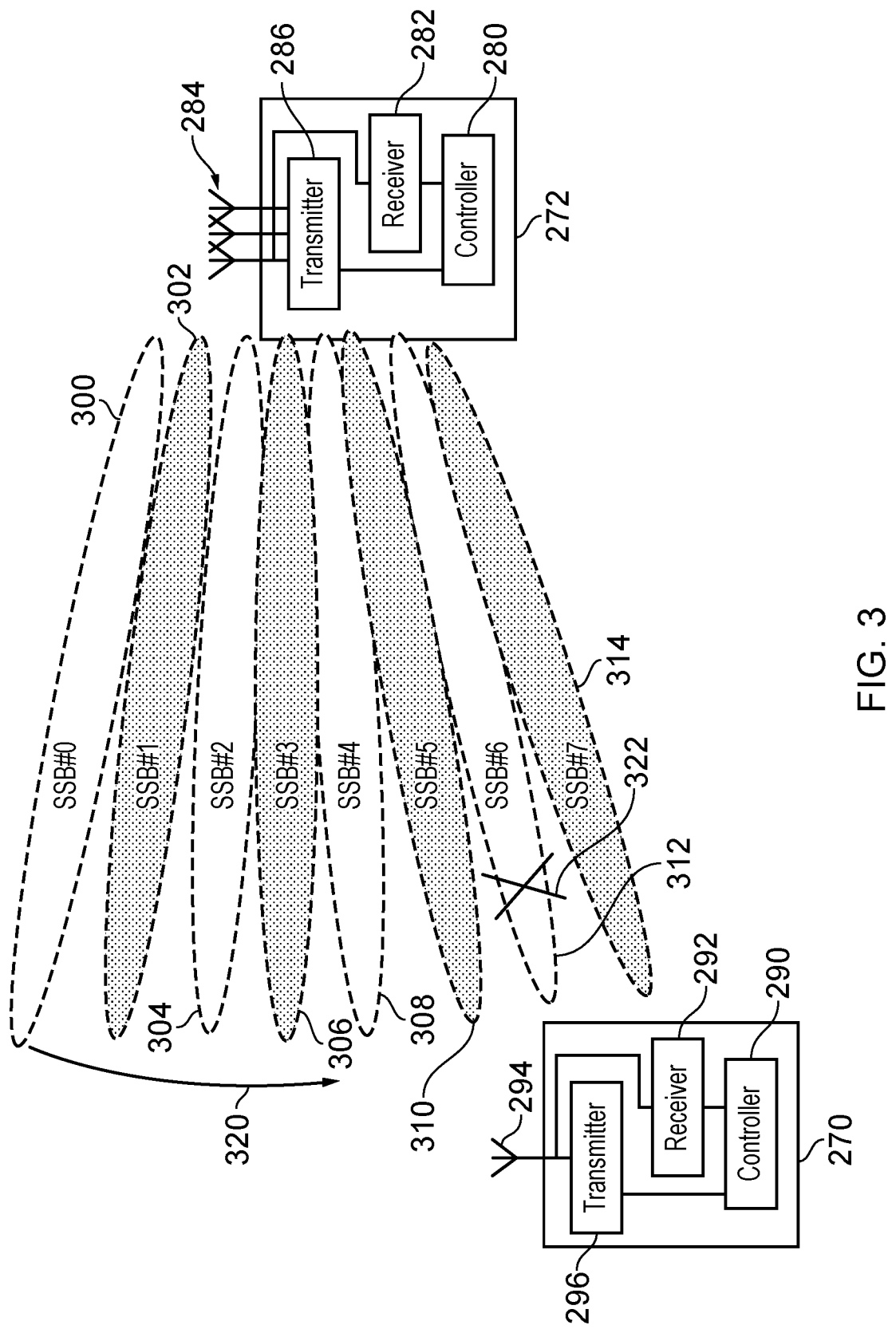
FIG. 3 is a schematic block diagram illustrating a communication device and an infrastructure equipment in more detail in which the infrastructure equipment is arranged to transmit a plurality of beams of radio signals which are displaced in one of space or time and each include a different version of a synchronisation signal.

FIG. 3 provides a more detailed view of components which form a UE 270 and an infrastructure equipment 272. The infrastructure equipment 272 may be formed from a combination of the TRP 211, 212 and distributed unit shown in FIG. 2 or may form part of an eNB or gNB of the mobile communications network shown in FIG. 1. As shown in FIG. 3 the infrastructure equipment 272 is shown to comprise a controller 280, a receiver 282 connected to the controller 280 and also connected to an antenna array comprising a plurality of antennas 284. The infrastructure 272 also includes a transmitter 286 also connected to the antenna array 284. Correspondingly the UE 270 includes a controller 290 connected to a receiver 292 which is also connected to an antenna 294. The controller 270 is also connected to a transmitter 296. As for the example shown for the infrastructure equipment 272, the antenna 294 may comprise a plurality of antennas forming an antenna array which can be used for beam forming and steering for directional transmission of signals or directional reception of signals in which signals combine coherently within the beam and therefore have increased signal strength. However for simplicity with the following explanation FIG. 3 shows only a single antenna 294 for the UE 276.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

As shown in FIG. 3 the infrastructure equipment 272 configures its antenna array 284 to transmit radio signals in beams by transmitting the same signal from each antenna of the array 284 for example with a different phase so that the signals combine coherently as a beam in a particular direction. As shown in FIG. 3 the infrastructure equipment 272 configures the transmitter to transmit a sequence of beams

300, 302, 304, 306, 308, 310, 312, 314 which are swept over a geographical location as represented by an arrow 320. Accordingly by focusing the transmitted signals into a beam, a coverage improvement is provided within a cell formed by the infrastructure equipment 272.

As a result of a time with respect to direction relationship of the beams 300, 302, 304, 306, 308, 310, 312, 314, each of the beams 300, 302, 304, 306, 308, 310, 312, 314 may transmit different content as a result of a time divided structure of a wireless access interface formed by the infrastructure equipment 272. A better explanation can be appreciated from FIG. 4.

Figure 4:
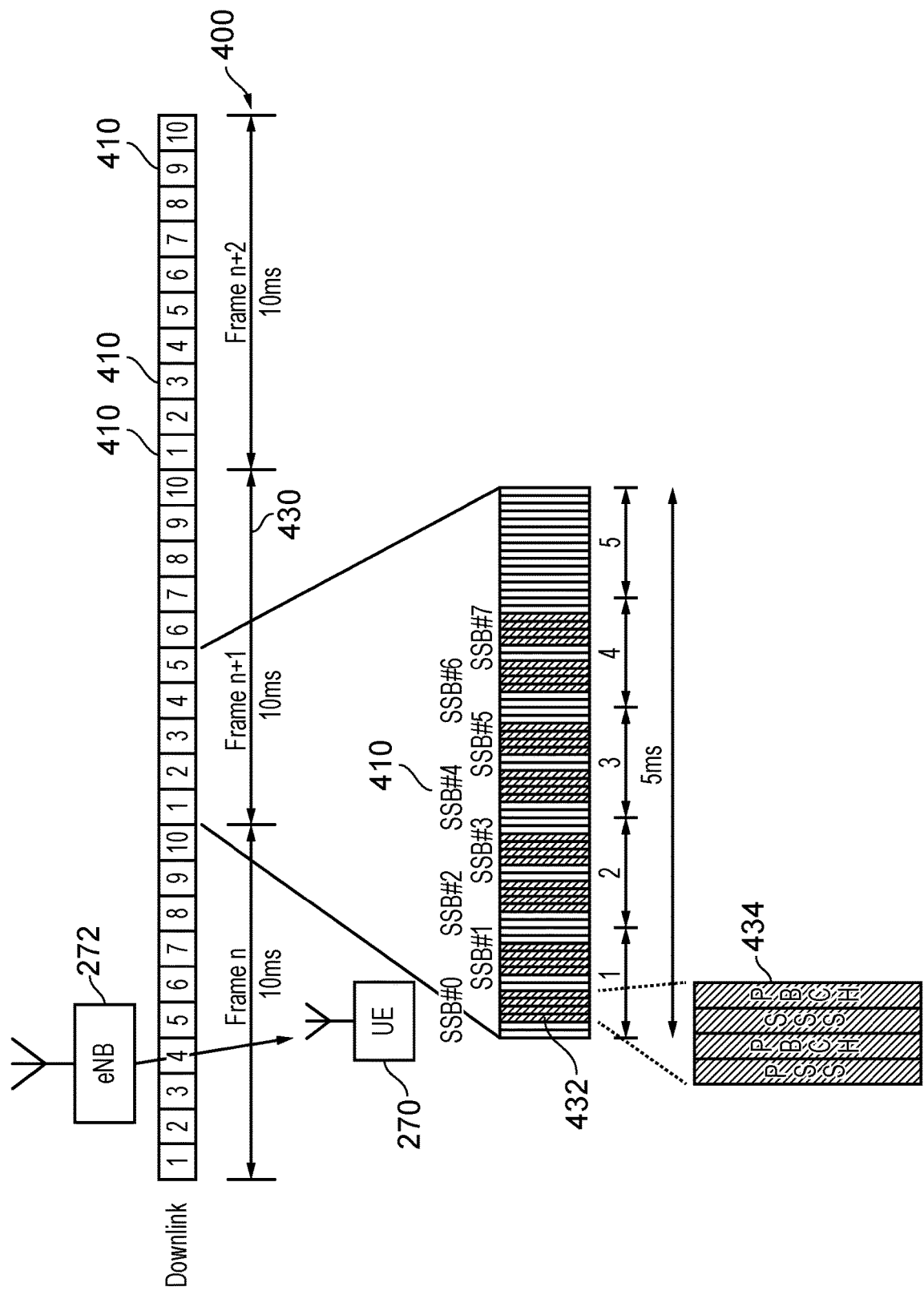
FIG. 4 is a simplified representation of a downlink frame structure of a proposed NR or 5G standard such as that disclosed in TS 38.213.

FIG. 4 provides a schematic representation of a time divided structure of a downlink of a wireless access interface formed by a wireless communications network. Downlink transmissions as shown in FIG. 4 occur from transmitting radio signals from the infrastructure equipment 272 to the UE 270. As explained above the wireless access interface formed by the wireless communications network may conform to 3GPP LTE or 5G or new radio as defined in TS 38.213 the contents of which are herein incorporated by reference. According to these 3GPP standards therefore, a bandwidth of radio frequencies is divided in time into a plurality of frames 400 which have a duration of 10 milliseconds. Within each of the frames 400 there are ten sub-frames 410. An expanded view of the first five sub-frames 410, that is half of the frame which has a duration of 5 milliseconds, is shown as an expanded view. Each of the sub-frames comprises 14 OFDM symbols which can be divided into two slots each providing 7 OFDM symbols when 15 KHz subcarrier spacing is applied.

The present embodiments concern transmitting synchronisation signals as part of the time divided frame structure shown in FIG. 4. As currently being proposed by 3GPP for new radio or 5G, a wireless communications network transmits synchronisation signals (as for 3GPP LTE or 4G). The synchronisation signals comprise a primary synchronisation signal (PSS), a secondary synchronisation signal (SSS) as well as a physical broadcast channel (PBCH). The PSS, SSS and PBCH are known as a synchronisation signal block (SSB). The PSS, SSS, PBCH are transmitted in order for a UE which is initially accessing the wireless communications network to gain synchronisation with the frame structure shown in FIG. 4 for both downlink reception and correspondingly uplink transmission of data to the network. As shown in FIG. 4 therefore and in accordance with 1 example, each SSB spans 4 OFDM symbols in time and is transmitted periodically every 20 milliseconds for the purpose of providing synchronisation to UE's gaining initial access to the wireless communication network. The SSBs are multiplexed in the time domain as shown in FIG. 4 within a 5 millisecond duration that is either in the first half or second half of each frame. As shown in FIG. 4, within the 5 slots of the first half of the frame 430, in each slot of each sub-frame, 4 OFDM symbols are shown with darker shading 432 which carry the SSB. An expanded view of the SSB #0 432 is shown on a larger scale by blocks 434. As shown in FIG. 4 the 4 OFDM symbols in the blocks 434 carry the SSS and the PBCH for SSB #0. Returning to FIG. 3 therefore because the beams 300, 302, 304, 306, 308, 310, 312, 314 are transmitted at different times in different directions, each beam carries a different SSB which as shown in FIG. 3 are numbered SSB #0 to SSB #7.

As explained above a UE wishing to gain initial access to wireless communications network must synchronise with the wireless access interface and more particularly with the frame structure shown in FIG. 4 in order to transmit data on the uplink as well as receive data on the downlink. As shown in FIG. 3 therefore the controller 290 controls the receiver 292 in order to detect one or more of the beams 300, 302, 304, 306, 308, 310, 312, 314. As explained above because each of the beams carries a different SSB (SSB #n), the UE can identify the beam with respect to the SSB which can be received.

According to a convention arrangement the UE 270 may acquire synchronisation from one of the beams 300, 302, 304, 306, 308, 310, 312, 314 which it can receive. This may, for example, be the beam which has the highest received signal strength. Accordingly, the UE 270 may proceed to acquire synchronisation from the synchronisation block carried by the beam with the highest signal strength. In some examples the controller 290 of the UE 270 may be configured to accumulate the synchronisation signals transmitted from the same beam over more than one 20 millisecond period in case the received signal strength is weak. Thus the UE accumulates the synchronisation signal in every 20 milliseconds for example up to a maximum of 80 milliseconds which represents four copies of the same SSB. Furthermore the UE 270 may first perform a process in which it measures a signal strength from each of the beams 300-314 which it can receive before selecting the beam for which it will acquire the SSB.

Embodiments of the present technique can provide an arrangement for improving a likelihood of a UE gaining accurate synchronisation to a wireless communications network and/or reducing a time which the UE needs in order to acquire synchronisation from the wireless communications network. In some examples the embodiments of the present technique provide particular application with so called unlicensed or unregulated networks.

Un-licensed 5G or new radio unlicensed (NR-U) wireless communications networks may be deployed in an unlicensed or unregulated radio frequency band in which other devices may be transmitting or receiving radio signals. Accordingly, the wireless communications network must perform a politeness policy to prevent conflicting or interfering with the transmission or reception of other devices. Accordingly such wireless communications network perform a "listen before talk" procedure in which the infrastructure equipment listens to a channel to detect whether or not another device is transmitting on that channel before transmitting itself. Correspondingly the infrastructure equipment may receive other indications of devices listening on a particular channel or radio frequency band and so does not transmit on that radio frequency channel or band at that time. Embodiments of the present technique therefore provide an arrangement in which a UE can acquire synchronisation from an infrastructure equipment operating in an unlicensed or unregulated band such as NR-U in which a listen before talk (LBT) procedure may be performed which prevents the transmission of a beam of radio signals with which the UE is currently synchronising. Returning to FIG. 3, for the example shown, the UE 270 may be attempting to receive the SSB #6 from the beam 312. Thus although the UE 270 may have selected the radio beam 312 as having the best signal strength during a measurement process, the infrastructure equipment 272 subsequently performs an LBT procedure for which the radio beam 312 carrying SSB #6 fails so that this beam 312 is no longer transmitted. As shown in FIG. 3, a cross 322 represents an example in which the radio beam 312 carrying SSB #6 is not transmitted as a result of an LBT failure. Accordingly, the UE 270 would have to reacquire synchronisation from another beam or wait until the preferred beam 312 once again becomes available.

There have been proposals for example within 3GPP (RAN 1 #93 and 94) to improve an initial access procedure in which synchronisation is acquired from SSB transmissions which may then be blocked by an LBT failure. Modifications to the initial access procedure have been proposed to consider limitations caused by LBT such as reducing the SSB/PBCH block size and increasing the transmission opportunities to compensate for LBT failure. Other proposals include shifting the SSB in time to a next transmission instance, cyclically wrapping the SSBs dropped due to LBT failure around to the end of the burst set and allowing flexibility of the wireless access interface to position the SSB index dynamically.

Figure 5:
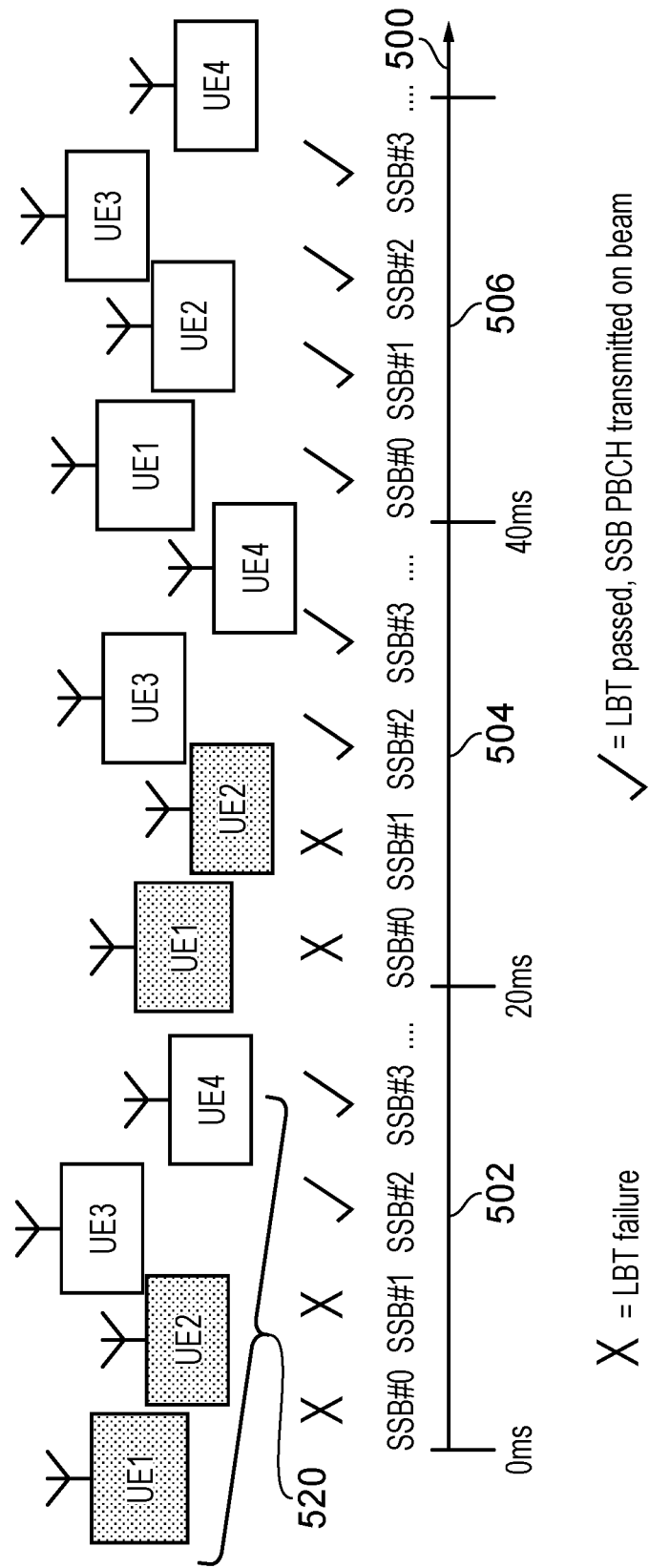
FIG. 5 is a schematic representation of an example in which each of a plurality of different communications devices are attempting to acquire synchronisation from four different beams of radio signals.

FIG. 5 provides an illustration of a delay which may be caused to some UEs wishing to gain synchronisation with a wireless access interface. As shown in FIG. 5 irrelative timing of the transmission of the radio beams carrying the synchronisation blocks is represented by an arrow 500 which is divided into three periods of 20 milliseconds 502, 504, 506. As explained with reference to FIG. 4, a period of 20 milliseconds is required in order to cycle through all possible synchronisation blocks which may be transmitted by each of the beams of radio signals. This is because whilst the first half of a transmission frame transmits each of the synchronisation blocks, these are not repeated until every other frame thereby causing a delay of 20 milliseconds in receiving the same synchronisation block. As shown in FIG. 5 each of four UEs 520, UE 1, UE 2, UE 3, UE 4 attempt to gain access to a wireless communications network by acquiring synchronisation from an SSB.

As shown in FIG. 5 each of the for UEs, UE 1, UE 2, UE 3, UE 4 520 is attempting to acquire synchronisation from one of the beams transmitting respectively SSB #0, SSB #1, SSB #2, SSB #3. However, as shown in first and second periods 502, 504, the beam which transmits SSB #0 and the beam which transmits SSB #1 are not transmitted so that UE1 and UE2 cannot acquire synchronisation in these periods 502, 504. However the beam transmitting SSB #2 and the beam transmitting SSB #3 is transmitted so that the third and fourth UEs UE 3, UE 4 are able to detect the SSB in these radio beams to acquire synchronisation. Since the radio beams carrying SSB #0 and SSB #1 are not transmitted until the third 20 millisecond period 506, then the first and second UEs, UE 1, UE 2 are not able to start acquiring synchronisation until 40 milliseconds has passed.

Embodiments of the present technique can provide an arrangement in which a UE controls its receiver to detect a plurality of beams of radio signals transmitted periodically according to a time divided structure of a wireless access interface provided by a wireless communications network in different spatial directions or at different times. The UE selects a first of the plurality beams of radio signals for detecting a first version of a synchronisation signal transmitted with the first beam of radio signals and selects a second of the plurality of beams of radio signals for detecting a second version of synchronisation signal transmitted with the second beam of radio signals. The UE controller 290 can then proceed to acquire synchronisation with the time divided structure of the wireless access interface from at least one of the first version of the synchronisation signal received from the first beam or the second version of the synchronisation signal received with the second beam. Accordingly, if during a process of acquiring synchronisation one of the selected first or second beams of radio signals stops being transmitted for example as a result of an LBT failure, then the UE 270 can continue with the process of acquiring synchronisation from the other of the radio beams thereby reducing a time to acquire synchronisation.

Figure 6:
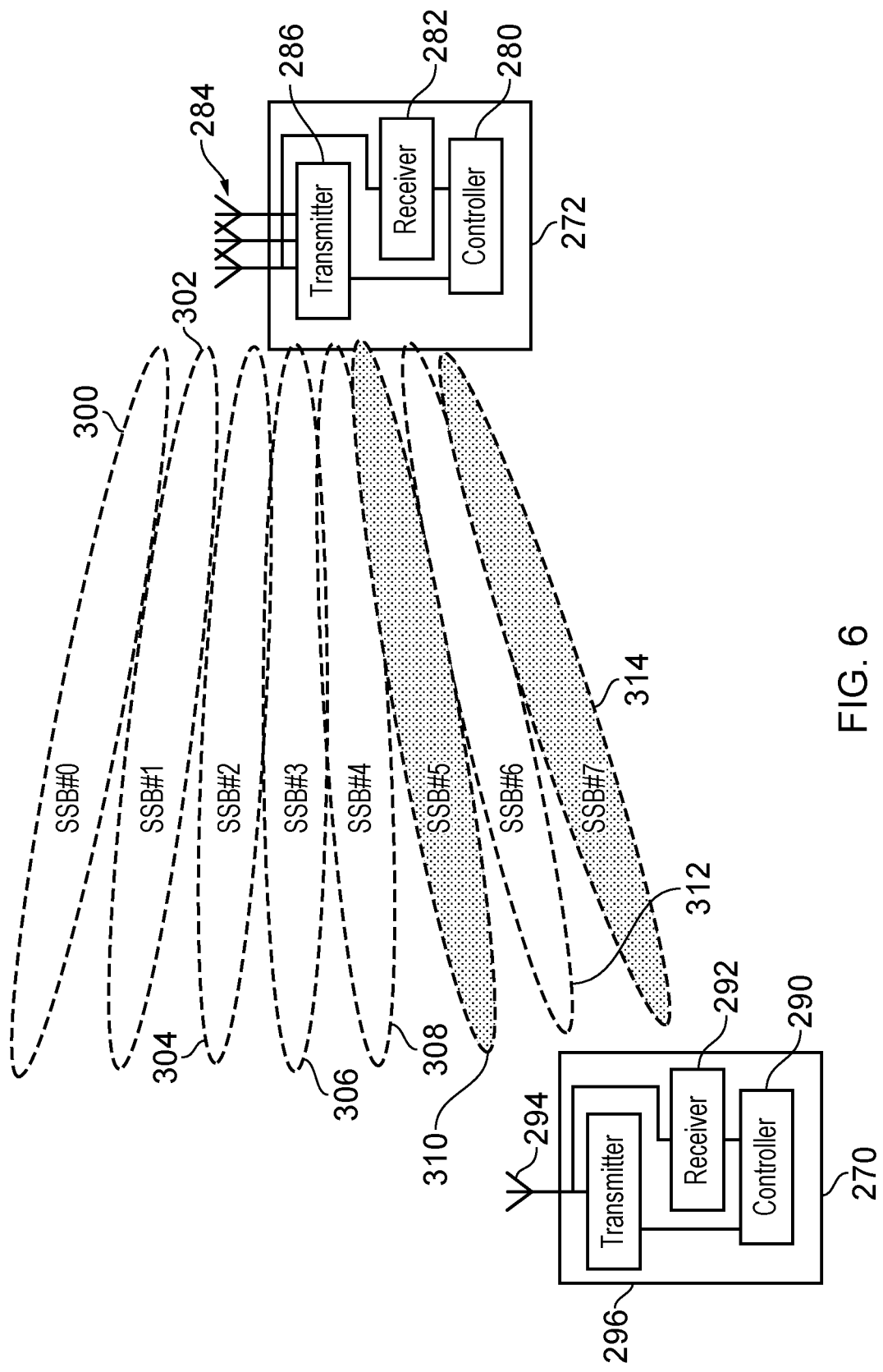
FIG. 6 is a schematic block diagram illustrating the infrastructure equipment arranged to transmit a plurality of beams of radio signals and the communication device as shown in FIG. 3 adapted to form an example embodiment in which more than one beam is used by the communications device to acquire synchronisation.

FIG. 6 provides an example illustration of an example embodiment of the present technique. As shown in FIG. 6 which corresponds substantially to FIG. 3 and so description will not be repeated, the UE 270 is configured to detect a plurality of the beams of radio signals 300 to 314. For the example as shown in FIG. 6 the controller 290 controls the receiver 292 to perform a signal strength measurement of each of the beams 310-314 which it can detect. For the example shown in FIG. 6, the UE 270 can detect three of the radio beams 310, 312, 314 transmitted from the infrastructure equipment 272. Having performed the signal strength measurements, the UE 270 then proceeds to acquire synchronisation by selecting two of the beams of radio signals 310, 314 providing SSB #5 and SSB #7 which are shown with grey shading.

In accordance with some example embodiments, the controller 290 of the UE 270 is configured to select the two beams of radio signals, which have the highest signal strength. The UE 270 may therefore select a first beam of radio signals 314 with the highest signal strength. However, the second beam of radio signals 310 may be selected based on a condition that the SSB is displaced in time by at least two SSBs, or the beam of radio signals is displaced spatially by at least two beams of radio signals. Thus the second beam selected may not be a beam providing the next highest signal strength but one which is displaced in either time or spatially in order to reduce a likelihood that the selected beam is blocked as a result for example of an LBT failure. Accordingly, as shown in FIG. 6 the controller 290 of the UE 270 selects the two shaded beams 310, 314.

According to another example the second beam 310 may be selected on a basis that it is within a range of signal strength with respect to the first beam selected that is lower than the first beam but within a predetermined range as determined by an offset. Accordingly, the UE 270 can ensure that the second beam selected provides sufficient signal strength in order to acquire synchronisation from the SSB transmitted with this radio beam. Since the occurrence of Paging occasions are linked to the presence of PBCH, in some embodiments, the technique described above of selecting more than beam to detect the SSB can also be applied to detect paging transmissions during a UE's paging occasions.

The example illustrated in FIG. 6 shows the plurality of beams being transmitted from the same infrastructure equipment 272. However it will be appreciated that in other examples the plurality of beams may be transmitted from more than one infrastructure equipment. For example two neighbouring infrastructure equipment may each be configured to transmit different sets of beams, each of which carries a different version of a synchronisation signal. Embodiments therefore also include an arrangement in which the controller 290 of the UE 270 is configured to select the two beams of radio signals from different infrastructure equipment.

Figure 7:
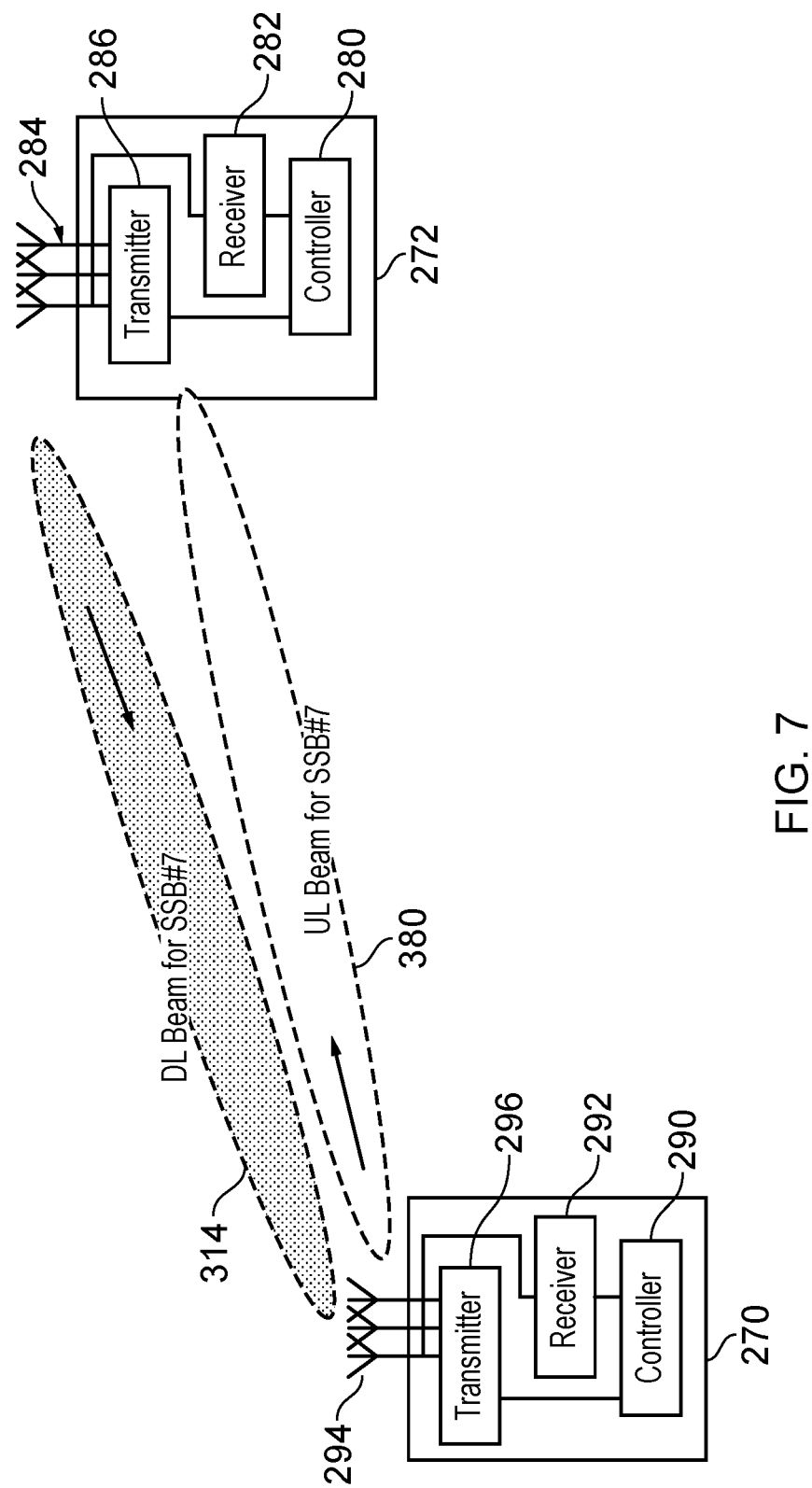
FIG. 7 is a schematic block diagram illustrating the infrastructure equipment and the communication device as shown in FIG. 3 adapted to perform a random access procedure using an uplink beam paired with the downlink beam after acquiring synchronisation.

Once the UE has acquired synchronisation from one or both of the selected beams of radio signals and receives the system information for example that provided by the PBCH, then the next step is for the UE to transmit to the infrastructure equipment for example by performing a random access procedure including transmitting a RACH preamble in PRACH resources provided by one of the beams. According to the present technique therefore the UE selects the random access preamble linked to the SSB which it is able to detect which has not stopped transmitting as a result of an LBT failure for example. FIG. 7 provides an example of an arrangement in which the UE proceeds to perform a random access procedure based on the SSB which it can receive from a selected downlink beam. FIG. 7 corresponds to FIGS. 3 and 6 and so a full description will not be repeated. However as shown in FIG. 7, the UE 270 having selected the downlink beam 314 carrying SSB #7 transmits a random access preamble in an uplink beam 380 to the infrastructure equipment 272. As shown in FIG. 7 the UE 270 is provided with an antenna array 294 which as explained above for the infrastructure equipment 272 can form radio signals into a beam such as the example shown in FIG. 7. In some examples the downlink beam 314 may be paired with the uplink beam 380 for the corresponding information received within the synchronisation block in this example SSB #7. Accordingly the UE transmits a random access preamble corresponding to SSB #7 to the infrastructure equipment 272 on the uplink beam 380.

Various criteria can be used for the UE 270 to select the uplink beam paired with the downlink beam from which it acquired synchronisation. This could be either the first beam or the second beam selected by the UE from which to acquire the SSB. In one example the UE selects the uplink beam 380 corresponding to the downlink beam 314 with the greatest signal strength. Another example the UE selects the uplink beam corresponding with the downlink beam which could be detected for the longest time with respect to the other of the two beams. As will be appreciated however at this point, the infrastructure equipment 280 is not aware of which of the radio beams the UE 270 can receive.

Embodiments of the present technique can provide an arrangement in which a random access procedure is adapted in order for the UE to inform the infrastructure equipment of which of a plurality of radio beams the UE can receive and therefore the infrastructure equipment may select the corresponding downlink beam on which it should transmit data. For example the infrastructure equipment may select one of a plurality of beams for transmitting downlink information, which the UE has indicated it can receive, based on whether the infrastructure equipment determines that it cannot continue transmitting on one of the radio beams for example as a result of an LBT failure. An example embodiment is shown in a message flow diagram of FIG. 8.

Figure 8:
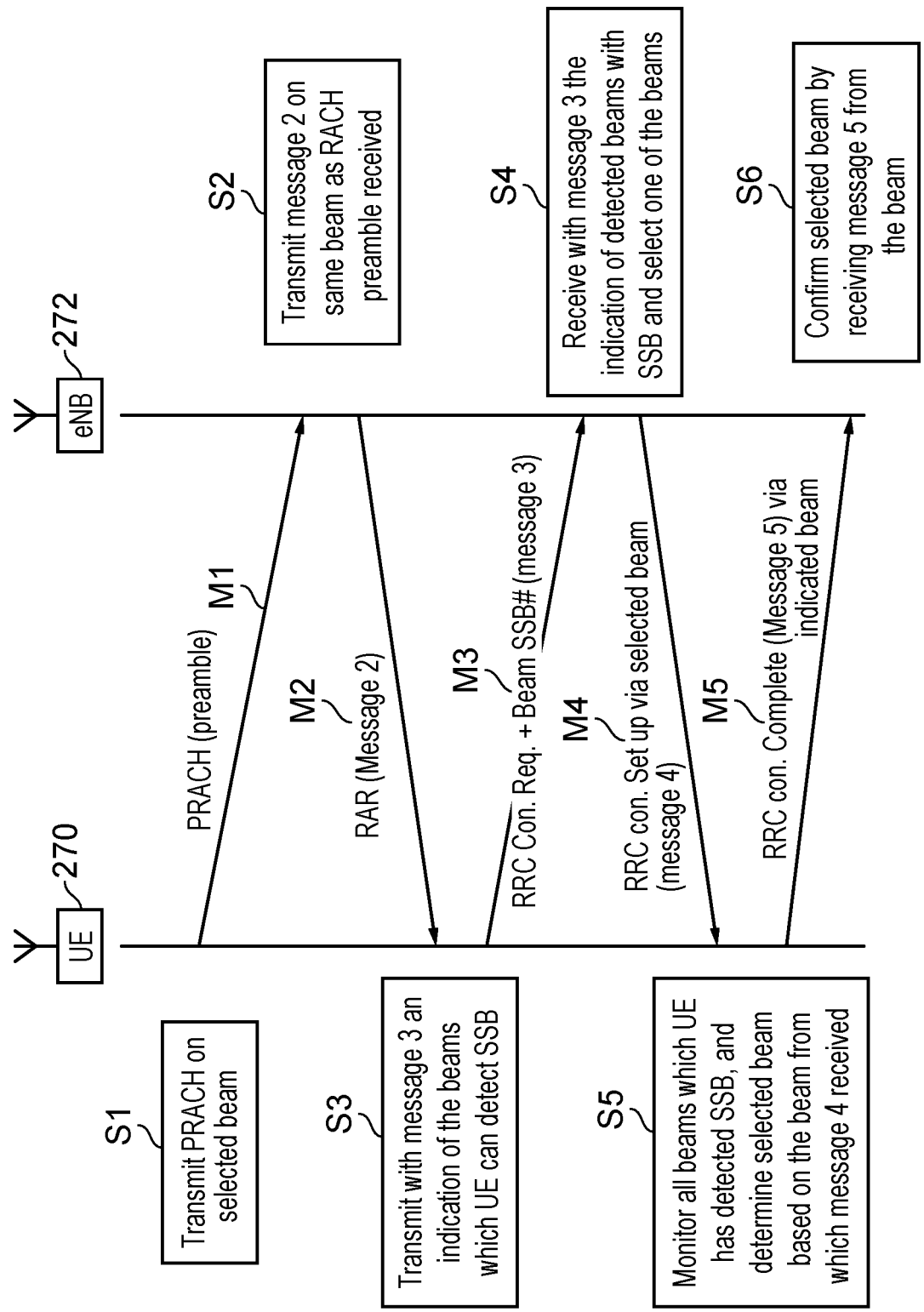
FIG. 8 is an example message exchange diagram of a random access procedure adapted in accordance with an example embodiment of the present technique.

As shown in FIG. 8, as a first step S1 the UE determines which of the uplink radio beams paired with the downlink radio beams it should select in order to transmit the RACH preamble in a corresponding PRACH indicated by the SSB for the selected beam. As indicated above in one example the UE selects the uplink beam corresponding to the downlink beam with the highest signal strength. This would therefore imply the lowest path loss. In another example the UE selects one of the selected radio beams which is most consistent in that it has been received for the longest time or based on the outcome of recent LBT procedure that it is less likely to fail.

In step S1 the UE transmits the preamble in the PRACH as a first random access message M1 to the infrastructure equipment 272. Since the infrastructure equipment 272 does not yet know which of the other radio beams on the downlink the UE can detect, the infrastructure equipment 272 transmits a random access response message (RAR) also known as message M2 in step S2 to the UE 270 on the same downlink beam corresponding to the uplink beam from which the RACH preamble was transmitted. The network may additionally assume that UE is able to monitor neighbouring beams and in case of LBT failure on the downlink of a corresponding beam, the network may send RAR on neighbouring beam as well. In step S3 the UE responds to the RAR message M2 transmitted in step S2 to transmit a response message M3 known as message 3. In a conventional operation the message 3 contains a radio communications control (RRC) connection request message. However in accordance with the present technique the RRC connection message M3 also includes an indication of a plurality of beams which the UE selected and from which it has acquired synchronisation so that these beams can be used by the infrastructure equipment 272 to transmit downlink data and control information to the UE 270. Accordingly in step S4 the infrastructure equipment 272 receives the indication of which of the downlink beams the UE 270 can detect and from which the UE has acquired synchronisation and determines which of the beams it should use to transmit messages and data to the infrastructure equipment 272. In one example the UE also provides an indication of a list of the beams based on for example the above criteria such as signal strength or reliability. Such information is deemed to be more useful for the network in case of 2 step RACH procedure because network may select an appropriate beam for downlink transmission of combined MSG2 and MSG4. In another example the infrastructure equipment selects the beam which should be used based on an LBT procedure which indicates whether or not one of those beams is more likely than the other(s) to be suspended as a result of potential interference. Accordingly, having selected the downlink beam the infrastructure equipment 272 transmits an RRC connection set up message M4 known as message 4 to the UE 270.

In step S5 the UE monitors each of the downlink beams which it can detect and has informed the infrastructure equipment 272 that it can detect with the response message 4. According to the beam from which the message 4 was detected, the UE determines that this is the beam selected by the infrastructure equipment for receiving downlink messages and information. Accordingly in step 5 the UE transmits an RRC connection message complete M5 (message 5) on the uplink beam corresponding to the downlink beam from which it received the RRC confirm set-up message M4 thereby confirming to the infrastructure equipment 272 that it can receive the messages on the downlink beam and confirming that this is the beam which should be used for subsequent communication.

Embodiments of the present technique as described above with reference to the 5G architecture can be applied to other architectures as well as the 4G architecture. Furthermore although example embodiments have been described with two radio beams it will be appreciated that this is just an example and a UE can select multiple radio beams for synchronising with the wireless access interface.

Various aspects and features of the present technique are defined in the appended claims. Various features of embodiments of the present technique are defined by the following numbered paragraphs:

Paragraph 1. A method of operating a communications device to transmit data to or to receive data from a wireless communications network, the method comprising detecting a plurality of beams of radio signals each being transmitted periodically according to a time divided structure of a wireless access interface provided by the wireless communications network in at least one of different spatial directions and at different times, selecting a first of the plurality of beams of radio signals for detecting a first version of a synchronisation signal transmitted with the first beam of radio signals, selecting a second of the plurality of beams of radio signals for detecting a second version of the synchronisation signal transmitted with the second beam of radio signals, and synchronising with the time divided structure of the wireless access interface from at least one of the first version of the synchronisation signal and the second version of the synchronisation signal.

Paragraph 2. A method according to paragraph 1, wherein the detecting the first version of the synchronisation signal transmitted with the first beam of radio signals, includes detecting one or more of a plurality of occasion when the first version of the synchronisation signal is transmitted with the first beam, and accumulating a detected synchronicity provided by each of the one or more detected occasions of the first version of the synchronisation signal from the first beam, and the detecting the second version of the synchronisation signal transmitted with the second beam of radio signals, includes detecting one or more of a plurality of occasion when the second version of the synchronisation signal is transmitted with the second beam, and accumulating a detected synchronicity provided by each of the one or more detected occasions of the second version of the synchronisation signal from the second beam.

Paragraph 3. A method according to paragraph 1 or 2, wherein the selecting the first beam comprises selecting one of the of the plurality of beams of radio signals which is received with a greatest signal strength, and the selecting the second beam comprises selecting one of the others of the plurality of beams of radio signals which is displaced in time or spatially by an amount from the first beam.

Paragraph 4. A method according to paragraph 3, wherein the second beam is selected from one of those of the others of the plurality of beams of radio signals which is displaced temporally or spatially from the first beam by a predetermined amount from the first beam, which has a greatest signal strength.

Paragraph 5. A method according to paragraph 1 or 2, wherein the selecting the first beam comprises selecting one of the of the plurality of beams of radio signals which is received with a greatest signal strength, and the selecting the second beam comprises selecting one of the others of the plurality of beams of radio signals which has a next greatest signal.

Paragraph 6. A method according to any of paragraphs 1 to 5, comprising selecting one of the first beam or the second beam from which to receive data transmitted via the wireless access interface or to transmit data via the wireless access interface on a first uplink beam paired with the first beam or a second uplink beam paired with the second beam.

Paragraph 7. A method according to paragraph 6, wherein the selecting one of the first beam or the second beam from which to receive data or to transmit data on a paired uplink beam comprises selecting the first beam or the second beam from which radio signals are received with a highest signal strength.

Paragraph 8. A method according to paragraph 6, wherein the selecting one of the first beam or the second beam from which to receive data or to transmit data on a paired uplink beam comprises determining a length of time for which the first version of the synchronisation signal from the first beam is detectable and a length of time for which the second version of the synchronisation signal is detectable from the second beam and selecting the first beam or the second beam depending on which of the first beam or the second beam are detectable for longer.

Paragraph 9. A method according to any of paragraphs 6, 7 or 8, comprising transmitting an indication of the first beam and the second beam selected from the plurality of beams via either the first uplink beam paired with the first beam or the second uplink beam paired with the second beam depending on whether the first beam or the second beam is selected as the beam to receive data, the indication of the first beam and the second beam being used to identify the first beam and the second beam.

Paragraph 10. A method according in any of paragraphs 6, 7 or 8, comprising transmitting a random access preamble on random access channel as part of a random access procedure on either the first uplink beam paired with the first beam or the second uplink beam paired with the second beam depending on which of the first beam or the second beam is selected to receive data, receiving a random access response second message transmitted in response to the transmitting the random access preamble, transmitting a random access third message as part of the random access procedure configured providing an indication of the first beam and the second beam, monitoring the first beam and the second beam for a random access response fourth message, and if the random access response fourth message is received on the first beam, receiving the data from the first beam, or if the random access response fourth message is received on the second beam, receiving the data from the second beam.

Paragraph 11. A method according to paragraph 10, wherein the receiving the random access response second message comprises receiving the random access response second message transmitted via the first beam or transmitted via the second beam depending on whether the random access preamble was transmitted on the first uplink beam paired with the first beam or the second uplink beam paired with the second beam in accordance with the selection.

Paragraph 12. A method according to paragraph 10, wherein the receiving the random access response second message comprises receiving the random access response second message transmitted via a first neighbouring beam, which neighbours the first beam or transmitted via a second neighbouring beam, which neighbours the second beam depending on whether the random access preamble was transmitted on the first uplink beam paired with the first beam or the second uplink beam paired with the second beam in accordance with the selection.

Paragraph 13. A method according to paragraph 10, 11 or 12, wherein the transmitting the data includes transmitting the data using the first uplink beam paired with the first beam if the fourth random access response message is received on the first beam, or transmitting the data using the second uplink beam paired with the second beam if the fourth random access response message is received on the second beam.

Paragraph 14. A method according in any of paragraphs 6, 7 or 8, wherein the transmitting the indication of the first beam and the second beam, comprises transmitting a message as part of a random access procedure via a beam paired with the second beam, the message providing an indication of the first beam and the second beam, and the receiving in response the indication of which of the first beam and the second beam should be used, comprises receiving the indication as part of a random access response message.

Paragraph 15. A method according to any of paragraphs 1 to 12, comprising
- monitoring a first paging occasion on the selected first beam for a paging message transmitted from the wireless communications network,
- monitoring a second paging occasion on the selected second beam for the paging message transmitted from the wireless communications network, and
- receiving downlink data in response to the paging message detected from the first selected beam or the second selected beam.

Paragraph 16. A communications device for transmitting data to or receiving data from a wireless communications network, the communications device comprising
- transmitter circuitry configured to transmit signals via a wireless access interface provided by the wireless communications network,
- receiver circuitry configured to receive signals transmitted via the wireless access interface, and
- controller circuitry configured to control the transmitter circuitry and the receiver circuitry to transmit or to receive the signals, the control circuitry being configured to control the receiver circuitry
- to detect a plurality of beams of radio signals each being transmitted periodically according to a time divided structure of the wireless access interface provided by the wireless communications network in different spatial directions,
- to select a first of the plurality of beams of radio signals for detecting a first version of a synchronisation signal transmitted with the first beam of radio signals,
- to select a second of the plurality of beams of radio signals for detecting a second version of the synchronisation signal transmitted with the second beam of radio signals, and
- to synchronise the transmitter circuitry and the receiver circuitry with the time divided structure of the wireless access interface from at least one of the first version of the synchronisation signal and the second version of the synchronisation signal.

Paragraph 17. A method of operating infrastructure equipment for forming part of a wireless communications network, the method comprising
- transmitting a plurality of downlink beams of radio signals periodically according to a time divided structure of a wireless access interface provided by the wireless communications network in different spatial directions and at different times, each of the plurality of downlink beams carrying a different version of a synchronisation signal,
- detecting from one of a plurality of uplink beams paired with one of the plurality of downlink beams an indication that a communications device has synchronised with a first of the downlink beams and a second of the downlink beams, the uplink beam on which the indication is received being paired with one of the first downlink beams or the second downlink beams,
- determining whether to transmit downlink data to the communications device using the first downlink beam or the second downlink beam, and
- transmitting a response message on one of the first downlink beam or the second downlink beam depending on which of the first downlink beam or the second downlink beam is selected for communicating downlink data.

Paragraph 18. A method according to paragraph 17, wherein the indication received on the uplink beam is a message transmitted as part of a random access procedure, and the response message is transmitted as part of the random access procedure.

Paragraph 19. A method according to paragraph 17 or 18, wherein the detecting from one of a plurality of uplink beams paired with one of the plurality of downlink beams an indication that a communications device has synchronised with a first of the downlink beams and a second of the downlink beams comprises
- receiving a random access preamble on random access channel as part of a random access procedure on either a first uplink beam paired with the first downlink beam or a second uplink beam paired with the second downlink beam,
- transmitting a random access response second message transmitted in response to the received random access preamble, and
- receiving a random access third message as part of the random access procedure providing the indication of the first downlink beam and the second downlink beam.

Paragraph 20. A method according to paragraph 19, wherein the transmitting the response message on one of the first downlink beam or the second downlink beam depending on which of the first downlink beam or the second downlink beam is selected for communicating downlink data, comprises transmitting a random access response fourth message on one of the first downlink beam or a second downlink beam.

Paragraph 21. A method according to paragraph 19 or 20, wherein the transmitting the random access response second message comprises transmitting the random access response second message via the first downlink beam or via the second beam depending on whether the random access preamble was received on the first uplink beam paired with the first downlink beam or the second uplink beam paired with the second downlink beam.

Paragraph 22. A method according to paragraph 19 or 20, wherein the transmitting the random access response second message comprises transmitting the random access response second message via a first neighbouring beam, which neighbours the first beam or via a second neighbouring beam, which neighbours the second beam depending on whether the random access preamble was received on the first uplink beam paired with the first downlink beam or the second uplink beam paired with the second downlink beam.

Paragraph 23. Infrastructure equipment for forming part of a wireless communications network, the infrastructure equipment comprising
- transmitter circuitry configured to transmit radio signals via a wireless access interface provided by the wireless communications network,
- receiver circuitry configured to receive radio signals transmitted via the wireless access interface, and
- controller circuitry configured to control the transmitter circuitry and the receiver circuitry, and
- an antenna array coupled in co-operation with the transmitter for transmitting the radio signals as a directional beam, wherein the controller circuitry is configured to control the transmitter circuitry with the antenna array
- to transmit a plurality of downlink beams of radio signals periodically according to a time divided structure of the wireless access interface provided by the wireless communications network in different spatial directions and at different times, each of the plurality of downlink beams carrying a different version of a synchronisation signal, and the controller circuitry is configured in combination with the receiver to detect on one of a plurality of uplink beams paired with one of the plurality of downlink beams an indication that a communications device has synchronised with a first of the downlink beams and a second of the downlink beams, the uplink beam on which the indication is received being paired with one of the first downlink beams or the second downlink beams, to determine whether to transmit downlink data to the communications device using the first downlink beam or the second downlink beam, and to transmit a response message on one of the first downlink beam or the second downlink beam depending on which of the first downlink beam or the second downlink beam is selected for communicating downlink data.

Paragraph 24. Infrastructure equipment according to paragraph 14, wherein the indication received on the uplink beam is a message transmitted as part of a random access procedure, and the response message is transmitted as part of the random access procedure.

Paragraph 25. Circuitry for transmitting data to or receiving data from a wireless communications network, the circuitry comprising transmitter circuitry configured to transmit signals via a wireless access interface provided by the wireless communications network, receiver circuitry configured to receive signals transmitted via the wireless access interface, and controller circuitry configured to control the transmitter circuitry and the receiver circuitry to transmit or to receive the signals, the control circuitry being configured to control the receiver circuitry to detect a plurality of beams of radio signals each being transmitted periodically according to a time divided structure of the wireless access interface provided by the wireless communications network in different spatial directions, to select a first of the plurality of beams of radio signals for detecting a first version of a synchronisation signal transmitted with the first beam of radio signals, to select a second of the plurality of beams of radio signals for detecting a second version of the synchronisation signal transmitted with the second beam of radio signals, and to synchronise the transmitter circuitry and the receiver circuitry with the time divided structure of the wireless access interface from at least one of the first version of the synchronisation signal and the second version of the synchronisation signal.

Paragraph 26. Circuitry for forming part of a wireless communications network, the circuitry comprising transmitter circuitry configured to transmit radio signals via a wireless access interface provided by the wireless communications network, receiver circuitry configured to receive radio signals transmitted via the wireless access interface, and controller circuitry configured to control the transmitter circuitry and the receiver circuitry, and an antenna array coupled in co-operation with the transmitter for transmitting the radio signals as a directional beam, wherein the controller circuitry is configured to control the transmitter circuitry with the antenna array to transmit a plurality of downlink beams of radio signals periodically according to a time divided structure of the wireless access interface provided by the wireless communications network in different spatial directions and at different times, each of the plurality of downlink beams carrying a different version of a synchronisation signal, and the controller circuitry is configured in combination with the receiver to detect on one of a plurality of uplink beams paired with one of the plurality of downlink beams an indication that a communications device has synchronised with a first of the downlink beams and a second of the downlink beams, the uplink beam on which the indication is received being paired with one of the first downlink beams or the second downlink beams, to determine whether to transmit downlink data to the communications device using the first downlink beam or the second downlink beam, and to transmit a response message on one of the first downlink beam or the second downlink beam depending on which of the first downlink beam or the second downlink beam is selected for communicating downlink data.

It will be appreciated that numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009

[2] RP-160671, "New SID Proposal: Study on New Radio Access Technology," NTT DOCOMO, RAN #71

[3] R1-165364, "Support for Beam Based Common Control Plane", Nokia, Alcatel-Lucent Shanghai Bell, RAN1 #85

The invention claimed is:

1. A method of operating a communications device to transmit data to or to receive data from a wireless communications network, the method comprising
   detecting a plurality of beams of radio signals each being transmitted periodically according to a time divided structure of a wireless access interface provided by the wireless communications network in at least one of different spatial directions and at different times,
   selecting a first of the plurality of beams of radio signals for detecting a first version of a synchronisation signal transmitted with the first beam of radio signals,
   selecting a second of the plurality of beams of radio signals for detecting a second version of the synchronisation signal transmitted with the second beam of radio signals,
   synchronising with the time divided structure of the wireless access interface from at least one of the first version of the synchronisation signal and the second version of the synchronisation signal, and
   selecting one of the first beam or the second beam from which to receive data transmitted via the wireless access interface or to transmit data via the wireless access interface on a first uplink beam paired with the first beam or a second uplink beam paired with the second beam.

2. The method of claim 1, wherein the detecting the first version of the synchronisation signal transmitted with the first beam of radio signals, includes
   detecting one or more of a plurality of occasion when the first version of the synchronisation signal is transmitted with the first beam, and
   accumulating a detected synchronicity provided by each of the one or more detected occasions of the first version of the synchronisation signal from the first beam, and the detecting the second version of the synchronisation signal transmitted with the second beam of radio signals, includes
   detecting one or more of a plurality of occasion when the second version of the synchronisation signal is transmitted with the second beam, and
   accumulating a detected synchronicity provided by each of the one or more detected occasions of the second version of the synchronisation signal from the second beam.

3. The method of claim 1, wherein the selecting the first beam comprises selecting one of the of the plurality of beams of radio signals which is received with a greatest signal strength, and the selecting the second beam comprises selecting one of the others of the plurality of beams of radio signals which is displaced in time or spatially by an amount from the first beam.

4. The method of claim 3, wherein the second beam is selected from one of those of the others of the plurality of beams of radio signals which is displaced temporally or spatially from the first beam by a predetermined amount from the first beam, which has a greatest signal strength.

5. The method of claim 1, wherein the selecting the first beam comprises selecting one of the of the plurality of beams of radio signals which is received with a greatest signal strength, and the selecting the second beam comprises selecting one of the others of the plurality of beams of radio signals which has a next greatest signal.

6. The method of claim 1, wherein the selecting one of the first beam or the second beam from which to receive data or to transmit data on a paired uplink beam comprises selecting the first beam or the second beam from which radio signals are received with a highest signal strength.

7. The method of claim 1, wherein the selecting one of the first beam or the second beam from which to receive data or to transmit data on a paired uplink beam comprises determining a length of time for which the first version of the synchronisation signal from the first beam is detectable and a length of time for which the second version of the synchronisation signal is detectable from the second beam and selecting the first beam or the second beam depending on which of the first beam or the second beam are detectable for longer.

8. The method of claim 1, comprising transmitting an indication of the first beam and the second beam selected from the plurality of beams via either the first uplink beam paired with the first beam or the second uplink beam paired with the second beam depending on whether the first beam or the second beam is selected as the beam to receive data, the indication of the first beam and the second beam being used to identify the first beam and the second beam.

9. The method of claim 1, comprising
   transmitting a random access preamble on random access channel as part of a random access procedure on either the first uplink beam paired with the first beam or the second uplink beam paired with the second beam depending on which of the first beam or the second beam is selected to receive data,
   receiving a random access response second message transmitted in response to the transmitting the random access preamble,
   transmitting a random access third message as part of the random access procedure configured providing an indication of the first beam and the second beam,
   monitoring the first beam and the second beam for a random access response fourth message, and if the random access response fourth message is received on the first beam, receiving the data from the first beam, or if the random access response fourth message is received on the second beam, receiving the data from the second beam.

10. The method of claim 9, wherein the receiving the random access response second message comprises receiving the random access response second message transmitted via the first beam or transmitted via the second beam depending on whether the random access preamble was transmitted on the first uplink beam paired with the first beam or the second uplink beam paired with the second beam in accordance with the selection.

11. The method of claim 9, wherein the receiving the random access response second message comprises receiving the random access response second message transmitted via a first neighbouring beam, which neighbours the first beam or transmitted via a second neighbouring beam, which neighbours the second beam depending on whether the random access preamble was transmitted on the first uplink beam paired with the first beam or the second uplink beam paired with the second beam in accordance with the selection.

12. The method of claim 9, wherein the transmitting the data includes transmitting the data using the first uplink beam paired with the first beam if the fourth random access response message is received on the first beam, or transmitting the data using the second uplink beam paired with the second beam if the fourth random access response message is received on the second beam.

13. The method of claim 1, wherein the transmitting the indication of the first beam and the second beam, comprises transmitting a message as part of a random access procedure via a beam paired with the second beam, the message providing an indication of the first beam and the second beam, and the receiving in response the indication of which of the first beam and the second beam should be used, comprises receiving the indication as part of a random access response message.

14. The method of claim 1, comprising
monitoring a first paging occasion on the selected first beam for a paging message transmitted from the wireless communications network,
monitoring a second paging occasion on the selected second beam for the paging message transmitted from the wireless communications network, and
receiving downlink data in response to the paging message detected from the first selected beam or the second selected beam.

15. A communications device for transmitting data to or receiving data from a wireless communications network, the communications device comprising
transmitter circuitry configured to transmit signals via a wireless access interface provided by the wireless communications network,
receiver circuitry configured to receive signals transmitted via the wireless access interface, and
controller circuitry configured to control the transmitter circuitry and the receiver circuitry to transmit or to receive the signals, the control circuitry being configured to control the receiver circuitry to
detect a plurality of beams of radio signals each being transmitted periodically according to a time divided structure of the wireless access interface provided by the wireless communications network in different spatial directions,
select a first of the plurality of beams of radio signals for detecting a first version of a synchronisation signal transmitted with the first beam of radio signals,
select a second of the plurality of beams of radio signals for detecting a second version of the synchronisation signal transmitted with the second beam of radio signals,
synchronise the transmitter circuitry and the receiver circuitry with the time divided structure of the wireless access interface from at least one of the first version of the synchronisation signal and the second version of the synchronisation signal, and
select one of the first beam or the second beam from which to receive data transmitted via the wireless access interface or to transmit data via the wireless access interface on a first uplink beam paired with the first beam or a second uplink beam paired with the second beam.

16. A method of operating infrastructure equipment for forming part of a wireless communications network, the method comprising
transmitting a plurality of downlink beams of radio signals periodically according to a time divided structure of a wireless access interface provided by the wireless communications network in different spatial directions and at different times, each of the plurality of downlink beams carrying a different version of a synchronisation signal,
detecting from one of a plurality of uplink beams paired with one of the plurality of downlink beams an indication that a communications device has synchronised with a first of the downlink beams and a second of the downlink beams, the uplink beam on which the indication is received being paired with one of the first downlink beams or the second downlink beams,
determining whether to transmit downlink data to the communications device using the first downlink beam or the second downlink beam, and
transmitting a response message on one of the first downlink beam or the second downlink beam depending on which of the first downlink beam or the second downlink beam is selected for communicating downlink data, wherein
the detecting from one of a plurality of uplink beams paired with one of the plurality of downlink beams an indication that a communications device has synchronised with a first of the downlink beams and a second of the downlink beams comprises
receiving a random access preamble on random access channel as part of a random access procedure on either a first uplink beam paired with the first downlink beam or a second uplink beam paired with the second downlink beam,
transmitting a random access response second message transmitted in response to the received random access preamble, and
receiving a random access third message as part of the random access procedure providing the indication of the first downlink beam and the second downlink beam.

17. A method according to claim 16, wherein the transmitting the response message on one of the first downlink beam or the second downlink beam depending on which of the first downlink beam or the second downlink beam is selected for communicating downlink data, comprises transmitting a random access response fourth message on one of the first downlink beam or a second downlink beam.

* * * * *